(12) United States Patent
Metternich

(10) Patent No.: US 6,672,608 B2
(45) Date of Patent: Jan. 6, 2004

(54) FIFTH WHEEL FOR THE TRACTOR OR THE TRAILER OF AN ARTICULATED TRUCK

(75) Inventor: Heinz Rüdiger Metternich, Hamburg (DE)

(73) Assignee: Hamburger Patent Schmiede GmbH, Hamburg (DE)

(*) Notice: Subject to any disclaimer, the term of this patent is extended or adjusted under 35 U.S.C. 154(b) by 20 days.

(21) Appl. No.: 10/168,681

(22) PCT Filed: Dec. 19, 2000

(86) PCT No.: PCT/EP00/12934
§ 371 (c)(1),
(2), (4) Date: Jun. 21, 2002

(87) PCT Pub. No.: WO01/46001
PCT Pub. Date: Jun. 28, 2001

(65) Prior Publication Data
US 2002/0190497 A1 Dec. 19, 2002

(30) Foreign Application Priority Data
Dec. 22, 1999 (DE) .......................... 199 61 930
Apr. 28, 2000 (DE) .......................... 100 20 961
Sep. 7, 2000 (DE) .......................... 100 44 331

(51) Int. Cl.⁷ .............................. B60D 1/62; B60R 16/00
(52) U.S. Cl. ........................................ 280/422; 280/421
(58) Field of Search .......................... 280/420–422, 280/433

(56) References Cited
U.S. PATENT DOCUMENTS 3,711,122 A    1/1973   Holmberg et al.
5,000,472 A *  3/1991   Vick, Jr. .................... 280/420
5,044,653 A *  9/1991   Savanella ................... 280/421

FOREIGN PATENT DOCUMENTS

EP    0 058 075 A    8/1982
EP    0 058 075 A1   8/1982

* cited by examiner

Primary Examiner—Lesley D. Morris
Assistant Examiner—Matthew Luby
(74) Attorney, Agent, or Firm—Venable LLP; John P. Shannon

(57) ABSTRACT

The invention relates to a fifth wheel for the coupling of the tractor of an articulated truck with a truck trailer. The inventive fifth wheel comprises a wheel plate, a kingpin (20) with an inner bore and with an outer coupling or engaging surface (30) as well as with connections for linking electric and pneumatic supply lines between the tractor of an articulated truck and the truck trailer. The supply lines of the tractor of an articulated truck lead to a male connector (100) of a supply unit (10) and the supply lines from a female connector (200) in the interior of the kingpin (20) to the designated places on the truck trailer. The parts of the male connector (11–15) and the female connector (21–25) that pertain to the supply lines and that are interlinkable are configured as respective rotation-symmetrical bushes that are fit into each other in pairs. All bushes (11–15, 21–25) are aligned coaxially with respect to one another and with respect to the axis of the kingpin (20). The radially largest bush (11) and the inner bore of the kingpin (20) each have a diameter that is less than half the outer diameter of the coupling or engaging surface (30) of the kingpin (20).

1 Claim, 2 Drawing Sheets

FIFTH WHEEL FOR THE TRACTOR OR THE TRAILER OF AN ARTICULATED TRUCK

The invention relates to a fifth wheel for the coupling of the tractor of an articulated truck with a truck trailer comprising a wheel plate, a king pin with an inner bore and with an outer coupling or engaging surface as well as with connections for linking electric and pneumatic supply lines between the tractor of an articulated truck and the truck trailer, wherein the supply lines of the tractor of the articulated truck lead to a male connector of a supply unit and the supply lines from a female connector in the interior of the kingpin to the designated places on the truck trailer, the male connector being extendable from the supply part and retractable into the female connector, and wherein the male connector can rotate with respect to the female connector.

Such a fifth wheel is known (EP 816 211-A2), however, it has considerable drawbacks insofar, as due to the arrangement of the individual lines side by side in the kingpin, the latter must be bored to that extent that the lines and the line connections can be received within its interior, but the tensile strength has been decreased so far that it is not suitable for use in practice.

In a different known kingpin design (EP 058 075-A1), two concentric pressurised air lines are located within the interior of the kingpin and of the male connector. However, electrical lines are not provided there, rather, for example, the blinker lights of the truck trailer should be actuated through a battery on the trailer truck and through a radio frequency transmission.

In a further known coupling system (U.S. Pat. No. 3,181,887), a pressurised air line is lead through the interior of the kingpin. Flexible electrical lines are lead within the kingpin as well as within the male connector of the supply unit to co-operating pins and slide rings. However, such contact connections do not result in reliable electrical connections and, furthermore, are not safe in operation due to possible contamination.

In a known vehicle coupling device (U.S. Pat. No. 3,428,334), two pressurised air lines are lead inside the kingpin, wherein electrical connections are implemented via co-operating sliders and slide rings arranged on matching conical surfaces. However, the electrical connections are not sufficiently safe in operation. This is supplemented by the fact that the kingpin has been made weak by the selected type of connection such that the coupling device is not usable in practice.

The invention is based on the task to design a fifth wheel of the type named above such that the kingpin has such a strength that the usually required operating license of the admission authorities can be issued and electrically faultless connections between male connector and female connector are possible.

This is achieved by the features indicated in the characterising part of the claim.

In the fifth wheel according to the invention, all connections, the pneumatic as well as the electric connections, are implemented by bushes coaxially aligned and fit into one another. Bushes fit into one another have a relatively large effective surface, which results in faultless contacts in the electric lines.

The engaging surfaces of these bushes fit into one another lie in an area arranged radially inside with respect to the coupling or engagement surface of the kingpin, that is an area, where during shunting of the trailer receiver by the tractor of the articulated truck little or hardly any relative movements occur.

The bushes for all lines are arranged coaxially with respect to one another such that the pressurised air lines are connected with each other on the outside with regard to the electrical lines. This make it possible to clean the areas of the electrical connections by means of pressurised air blasts before the insertion of the male connector into the female connector. This is an advantage, which cannot be disregarded in the harsh operating conditions.

Finally, the radially largest bush or the inner bore surface of the kingpin are dimensioned such that their diameter is less than half the outer diameter of the coupling or engaging surface of the kingpin. With this dimensioning it can be achieved that the mechanical demands made on the kingpin are met.

The invention is explained below by way of example with reference to the drawing.

Figure 1:
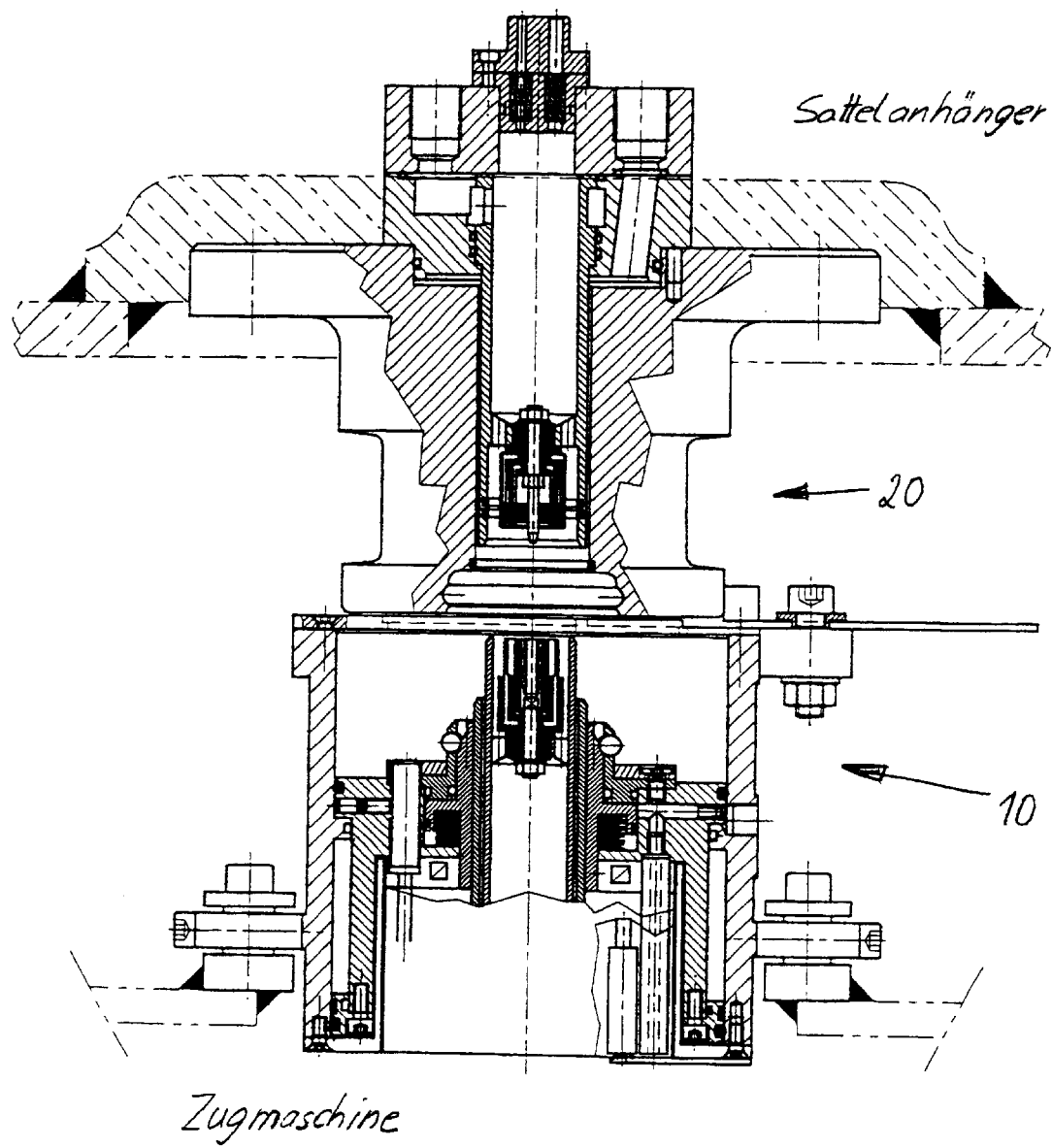
FIG. 1 shows a cross-sectional view through the kingpin of the truck trailer and the supply unit of a tractor.
Figure 2:
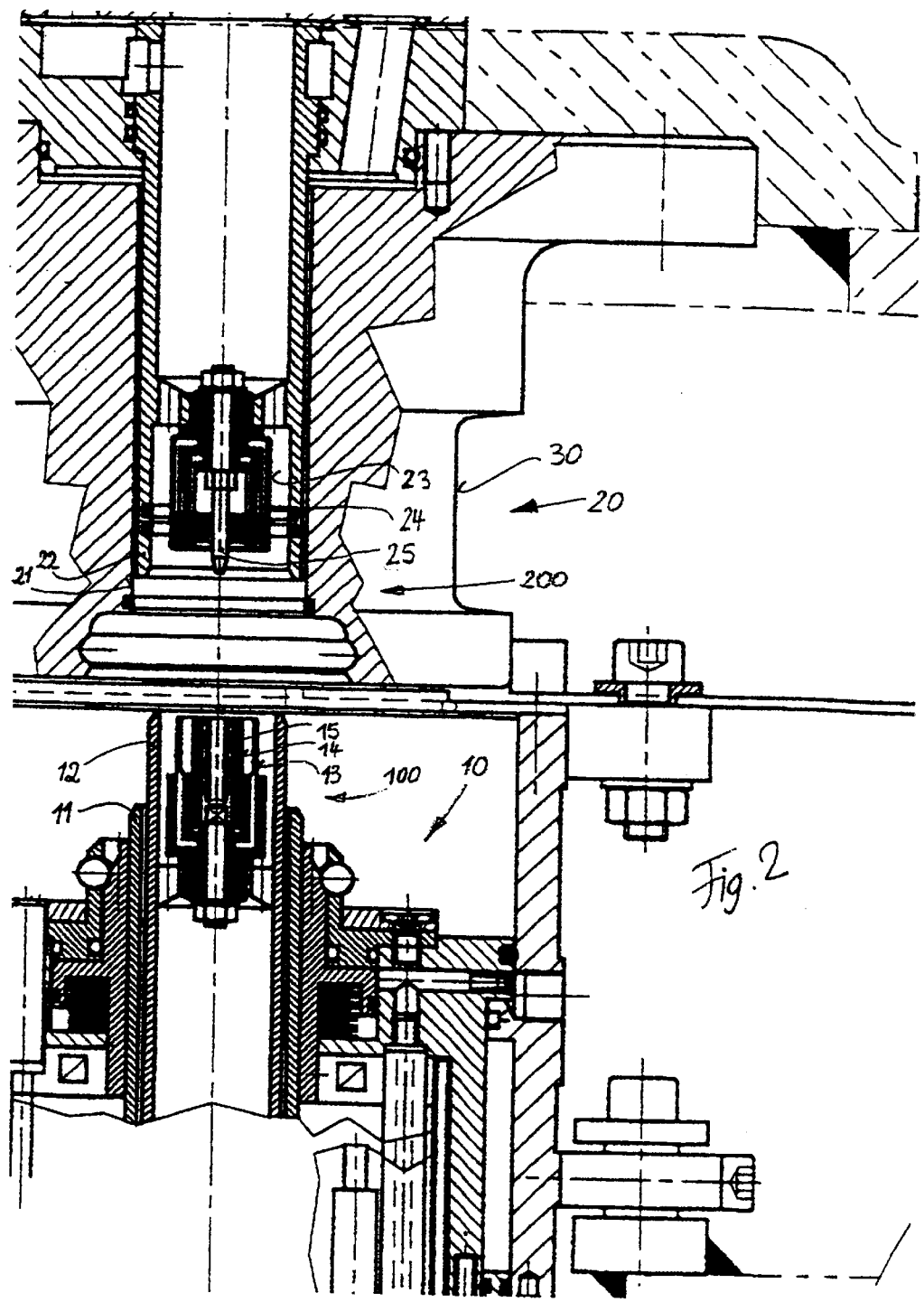
FIG. 2 is an enlarged illustration from FIG. 1.

In the figures, the co-operating parts, that is the kingpin and the supply unit, are shown just before the actual coupling process.

In the figures, the coupling pin 20 of the truck trailer is shown at the top area, while the supply unit 10 of the tractor of the articulated truck is shown in the bottom area.

The coupling pin 20 is mounted at the truck trailer, it passes into the opening of the wheel plate during the coupling process, and the mechanical connection between tractor of the articulated truck and truck trailer is implemented through parts engaging in the so-called coupling or engaging area 30 of the coupling pin 20 in known manner.

If a tractor of an articulated truck is provided with a supply unit 10 and a male connector 100 according to the present invention, the supply unit 10 will be centrally arranged below the coupling pin 20, and by extending the male connector 100 into a female connector 200 of the kingpin 20, the desired conditions are created.

By 11, 12, 13, 14 and 15 bushes of the male connector 100 are indicated, which are axially arranged to one another. Bushes 21, 22, 23, 24 and 25 co-operate with these bushes such that axially shifting engagement connections are possible.

The radially largest bush 11 of the male connector 100 is inserted into the inner bore 21 of the kingpin 20 and is sealed towards the outside. Confined within the bushes 11 and 22 and towards the inside by the bush 12, pressurised air can be transferred in this manner in an annular cylinder space from the tractor of the articulated truck to the truck trailer. Within the bush 12 and radially outside of the bush 23, a further annular space is provided for the transfer of pressure. The bushes 13 and 24 and 14 and 15 and 25 co-operate in corresponding manner, in order to provide electric connections, which are suited for transfer of digital data or of direct voltage.

What is claimed is:

1. Fifth wheel for the coupling of a tractor of an articulated truck with a truck trailer comprising a wheel plate, a kingpin (20) with an inner bore and with an outer coupling or engaging surface (30) as well as with connections for linking electric and pneumatic supply lines between the tractor of the articulated truck and the truck trailer, wherein the supply lines of the tractor of the articulated truck lead to a male connector (100) of a supply unit (10) and the supply lines from a female connector (200) in the interior of the kingpin (20) to the designated places at the truck trailer, the male connector (100) being extendable from the supply unit (10) and retractable into the female connector (200), and wherein the male connector (100) is rotatable with regard to the female connector (200), characterised in that the inter-connectable parts belonging to the supply lines of the male connector (11–15) and those of the female connector (21–25) are configured as respective rotational-symmetrical bushes that fit into each other in pairs, that the connecting areas of the bushes in the coupled condition are spatially confined to the area situated radially on the inside with respect to the coupling and engaging surface (30) of the kingpin (20), that all bushes (11–15, 21–25) are aligned coaxially to one another and to the axis of the kingpin (20), that the bushes (15, 25) for the direct voltage supply are arranged radially on the very inside of the kingpin (20) and in the supply unit (10), the bushes (13, 14, 23, 24) for data lines are arranged further towards the outside in the kingpin (20) and in the supply unit (10), and the bushes (11, 12, 21, 22) for the pressurised air supply lines surround the electrical lines, and that the radially largest bush (11) and the inner bore of the kingpin (20) each have a diameter that is less than half the outer diameter of the coupling or engaging surface (30) of the kingpin.

* * * * *